United States Patent [19]

Fukui

[11] 4,348,918
[45] Sep. 14, 1982

[54] SPEED CHANGE DEVICE

[75] Inventor: Kiyozumi Fukui, Gifu, Japan

[73] Assignee: Teijin Seiki Company Limited, Osaka, Japan

[21] Appl. No.: 116,750

[22] Filed: Jan. 30, 1980

[30] Foreign Application Priority Data

Feb. 21, 1979 [JP] Japan .................................. 54/19394
Aug. 31, 1979 [JP] Japan ................................ 54/110236

[51] Int. Cl.³ ............................................. F16H 1/28
[52] U.S. Cl. ......................................... 74/805; 74/804; 74/797
[58] Field of Search ................ 74/804, 805, 792, 797, 74/750 R, 640

[56] References Cited

U.S. PATENT DOCUMENTS

| | | | |
|---|---|---|---|
| 1,260,243 | 3/1918 | Moore | 74/804 |
| 3,129,611 | 4/1964 | Lee | 74/804 |
| 3,424,036 | 1/1969 | Colgan | 74/805 |
| 3,430,523 | 3/1969 | Merritt | 74/805 |
| 3,975,973 | 8/1976 | Haase | 74/805 |
| 3,985,047 | 10/1976 | Therkelsen | 74/805 |

FOREIGN PATENT DOCUMENTS 37-25398 10/1962 Japan.

OTHER PUBLICATIONS

"IBM Technical Disclosure Bulletin", Orbital Transmission Speed Reducer, D. W. Skinner, vol. 20, No. 1, Jun. '77, pp. 82-83.

Primary Examiner—Leslie Braun
Assistant Examiner—Lawrence J. Gotts
Attorney, Agent, or Firm—Burgess, Ryan and Wayne

[57] ABSTRACT

A speed change device comprises first and second outer gears, crankpins connected to the second outer gear, and pinions having pin holes for receiving the crankpins and outer gear teeth formed at the periphery thereof. The speed change device is characterized in that the pinion has through holes formed in a star shape, and a support block has a star shape corresponding to the shape of the through holes in the pinion, so that the support block is inserted into the through holes in order to support the crankpins by means of pairs of bearings.

9 Claims, 7 Drawing Figures

SPEED CHANGE DEVICE

TECHNICAL FIELD TO WHICH THE PRESENT INVENTION PERTAINS

The present invention relates to a speed change device more specifically, the present invention pertains to a so called planetary differential gear type speed change device which comprises: a first outer gear secured to an input shaft; a plurality of second outer gears meshing with the first outer gear; a plurality of crankpins which are connected to the second outer gears so that the rotary movement of the second outer gears is transduced into a rotational movements of the crankpins; a pinion which has a plurality of pin holes formed therein, which are circumferentially spaced from each other, and outer gear teeth formed at the periphery thereof; the crankpins being inserted into the pin holes so that the eccentric revolutional movement of the pinion is generated by means of the rotational movement of the crankpins; and a hub surrounding the outer gear teeth of the pinion and having inner gear teeth which mesh with the outer gear teeth.

PRIOR ART OF THE PRESENT INVENTION

A speed change device which has the construction mentioned above has been known, for example, by the disclosure in Japanese Patent Publication No. 25398/64. Such a speed change device is utilized wherein a large speed reduction must be achieved. However, there is a disadvantage in that the speed change device disclosed in the above-mentioned Japanese Patent Publication No. 25398/64 does not satisfy the requirements in certain fields, such as in the crawler vehicle field, so as to reduce the speed and to transmit an output torque which is sufficiently large, because the external size of the speed change device is large and accordingly the weight thereof is also large. More specifically, the above-mentioned speed change device has crankpins, one end of each of which is supported like a cantilever (hereinafter referred to as "cantilever manner"), and accordingly the amount of the output torque thereof is limited by the strength of the crankpins. If the diameter of the crankpins is increased in order to increase the output torque, the size of the bearing portions of the crankpins must be increased, and as a result, the external size of the speed change device is also increased.

Furthermore, there is another disadvantage in that in the speed change device disclosed in Japanese Patent Publication No. 25398/64, a driven shaft is rotatably supported by the case of the speed change device, and the case surrounds a hub provided with an inner gear, and accordingly, the external size of the speed change device is large because a certain amount of thickness of the case and a certain amount of clearance between the case and the hub are necessary.

SUMMARY OF THE INVENTION

The principal object of the present invention is to provide a speed change device which obviates the above-mentioned disadvantages, which has a small external size and weight and which produces a large output.

The present invention accomplishes the principal object by a speed change device which is characterized in that: the pinion has at least one through hole formed at spaces between adjacent pin holes thereof; a support block which has at least one column portion formed thereon and loosely inserted into the through holes of the pinion, and the opposite ends of which block rotatably support the crankpins; and at least one bearing which is mounted between the support block and the hub so that the relative rotational movement of the support block and the hub is permitted.

According to the present invention, the column portions of the support block are loosely inserted into the through holes formed in the pinion, and the opposite ends of the support block are utilized to support the opposite ends of the crankpins (hereinafter referred to as "beam manner"), and accordingly, the deflection of the crankpins can be minimized. In other words, if the critical deflection of the crankpins are the same, the output torque from a speed change device of the present invention is several times larger than that from a conventional speed change device wherein the crankpins are supported in a cantilever manner. Because of the stabilization of the crankpins which are supported in a beam manner and the reduction of the deflection thereof, bearings which are smaller in size than those in a conventional speed change device can be utilized, and accordingly, the external size of the speed change device becomes small. On the contrary, if the bearings are as large as those in a conventional speed change device, the life-span of the bearings is longer than those supporting the crankpins in a cantilever manner. In addition, because of the stabilization of the crankpins and the reduction of the deflection thereof, the efficiency of meshing between the outer gear teeth of the pinion and the inner gear teeth of the hub is increased, and accordingly, the transmission of a larger output torque is facilitated.

In a preferred embodiment of the present invention, the support block is composed of two parts, i.e., a body portion and an end plate, and the two parts are fixedly secured to each other when the speed change device is assembled. With this construction, the assembling operation of the speed change device is very much enhanced, and the size of the exterior of the speed change device is minimized. If the end plate is not formed separately and the support block is formed in one body with the body portion of the support block, in order to permit the support block to be assembled therein, the size of the pinion must be larger than the size which is necessary for inserting a disassemble type support block.

In a preferred embodiment of the present invention, the support block has a specially designed construction. More specifically, the support block in this embodiment includes a first portion extending circumferentially and a second portion extending radially and inwardly from the first portion. Accordingly, a stress exerted in a radial direction upon the generation of torque in the speed change device and a stress exerted in a radial direction caused by an external load connected to the speed change device are effectively borne by the second portion extending radially. A torsional stress created upon the generation of the torque by the speed change device is also effectively borne by the first portion extending circumferentially.

In a preferred embodiment of the present invention, the pinion has a plurality of through holes formed therein, the inner ends of which are connected to each other so that a star shape, radially and outwardly extending from the center, is formed, and the support block similarly has a plurality of column portions, the ends of which are connected to each other so that a star shape, radially and outwardly extending, is formed. Due to the specially designed construction of the support block, the support block has a higher rigidity against the load exerted in a radial direction than a support block not constructed in accordance with the present construction.

As illustrated in a preferred embodiment of the present invention, it is preferable that bearings be mounted between the outer surface of the support block and the inner surface of the hub so that the relative rotation of the support block and the hub is permitted. As a result, the case which surrounds the hub and which is indispensable in a conventional speed change device is unnecessary, and the support block that must surround the hub is not necessary. Accordingly, the external size of the speed change device is smaller than that of a conventional device. In this case, to shorten the length of the speed change device, it is preferable that one bearing be mounted between the outer surface of the body portion of the support block and the inner surface of the hub, and another bearing be mounted between the outer surface of the end plate and the inner surface of the hub. According to this construction, the sizes of the two bearings may be the same.

If pins having a small diameter are equidistantly mounted on the inner surface of the hub so as to form a pin gear as illustrated in an embodiment of the present invention, the eccentricity of the crank pins can be minimized, and the distance between the rotational center of the crankpin and the revolutional center of the pinion can be shortened. Accordingly, the external size of the speed change device is smaller than that of a conventional speed change device wherein involute gear teeth are utilized. In addition, the efficiency for meshing between the inner teeth of the hub and the outer teeth of the pinion is enhanced, and the clearance allowed between the through holes in the pinion and the peripheral walls of the column portion of the support block can be small.

It is preferable that, as illustrated in a preferred embodiment of the present invention, two or more pinions are disposed parallel within the hub so that they simultaneously mesh with the inner gear teeth of the hub. According to this construction, the fluctuation of the torque transmitted to the crankpins is decreased, and the torque is smoothly transmitted through the pinions.

BRIEF DESCRIPTION OF THE DRAWINGS

Some embodiments of the present invention will now be explained in detail with reference to the accompanying drawings, wherein.

DETAILED DESCRIPTION OF THE PREFERRED EMBODIMENT

Figure 1:
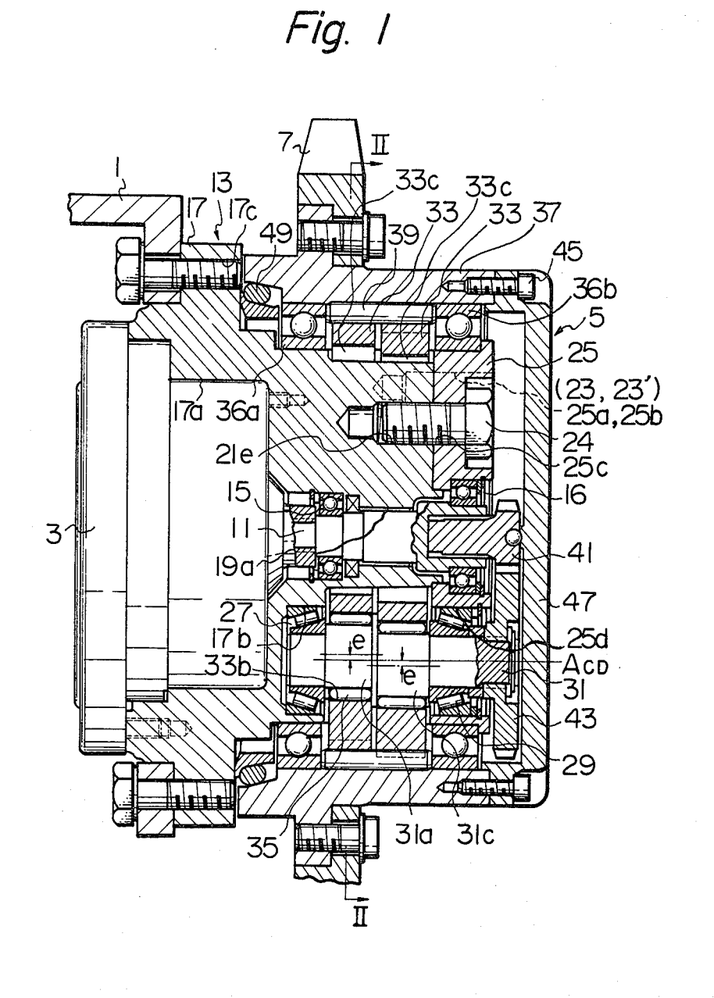
FIG. 1 is a cross sectional view of a first embodiment of the present invention.

Referring to FIG. 1 which illustrates a first embodiment of the present invention applied to a speed change device of a hydraulic motor with a speed change device for driving a crawler vehicle, a frame 1 of the crawler vehicle has a conventional hydraulic motor 3 fixed thereon, and the rotation of the hydraulic motor 3 is reduced by a speed change device 5. The large output torque thus obtained is transmitted to a sprocket 7 which forms a driving system in order to drive the sprocket. An output shaft 11 of the hydraulic motor 3 is also utilized as a rotary input shaft of the speed change device according to the present invention and is rotatably supported on a casing 13 of the hydraulic motor 3 via a pair of bearings 15 and 16. The casing 13 of the hydraulic motor 3 constitutes a support block of the speed change gear according to the present invention, and accordingly, it hereinafter will be referred to as a support block.

Figure 3:
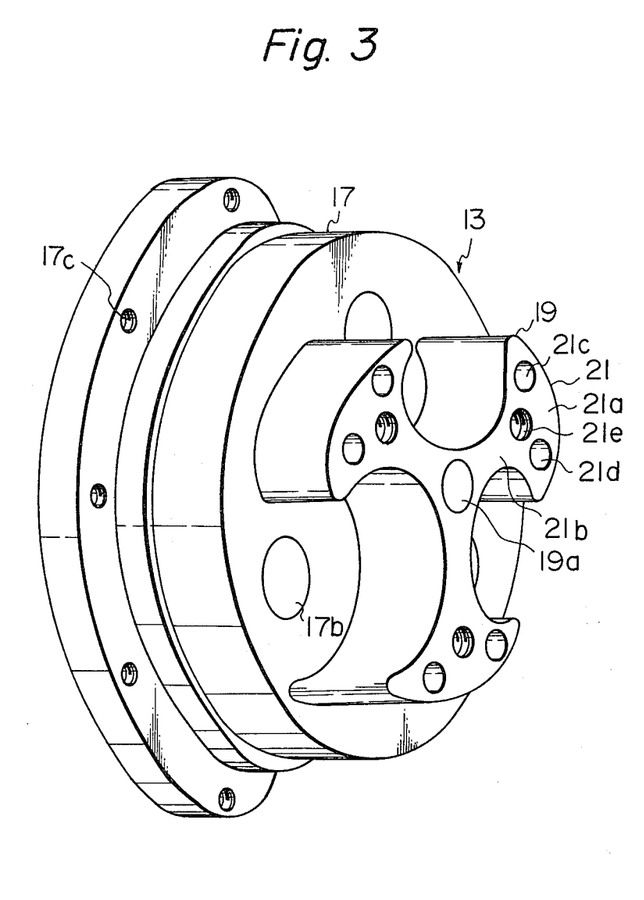
FIG. 3 is a perspective view of a support block which is utilized in the first embodiment.

The body portion of the support block 13 is composed of a disc portion 17 and a star shape portion 19 projecting from the disc portion 17 as illustrated in FIGS. 1 and 3. The rear side of the disc portion 17 has a recess 17a (FIG. 1) formed thereon which closely engages with the body portion of the hydraulic motor 3 (FIG. 1). The star shape portion 19 has three column portions 21 which are equidistantly arranged along the circumference and each of which comprises a head portion 21a extending circumferentially and a base portion 21b extending radially. The base portions 21b extend inwardly to the center of the column portion so that they are connected to each other. The surface of the disc portion 17 has bearing inserting holes 17b which have a predetermined certain depth and which are formed between the adjacent column portions 21. The surface of the disc portion 17 further has threaded holes 17c formed thereon which are utilized to secure the support block 13 to the frame 1 of the crawler vehicle by means of bolts. In addition, a central through hole 19a is formed at the center of the star shape portion 19, through which the rotary input shaft 11 is inserted. Pin holes 21c and 21d (FIG. 3) are formed on the head portions 21a of the column portions 21 which are utilized to integrally secure an end plate 25, which is a part of the support block 13, to the column portion 21 of the support block 13 by means of pins 23 and 23' as illustrated in FIG. 1. The size of the pins 23 and 23' is determined so that the pins can withstand the shearing stress created by the load. It should be noted that although two pins 23 and 23' are used in the embodiment of FIGS. 1 and 3, if necessary, the number of the pins or the diameter of the pins may be increased since the head portions 21a in which the pins may be arranged extend circumferentially. Thread holes 21e are formed on the column portions at positions radially inside the pin holes 21c and 21d and are utilized to secure the end plate 25 to the column portion 21 of the support block 13 by means of bolts 24.

Referring to FIG. 1, the end plate 25 has pin holes 25a and 25b corresponding to pin holes 21c and 21d (FIG. 3) of the column portions 21 and formed thereon; through holes 25c corresponding to thread holes 21e and formed thereon for inserting bolts therethrough; and bearing inserting holes 25d corresponding to the bearing inserting holes 17b formed on the disc portion 17 and formed thereon. Conventional roller bearings 27 and 29 are inserted into the bearing inserting holes 17b and 25d so that crankpins 31 are rotatably supported between the roller bearings 27 and 29. The crankpin 31 has two crank portions 31a and 31c which are eccentrically arranged by an amount e with respect to the rotational axis $A_{CD}$, and two pinions 33 are inserted onto the crank portions 31a and 31c.

Figure 4:
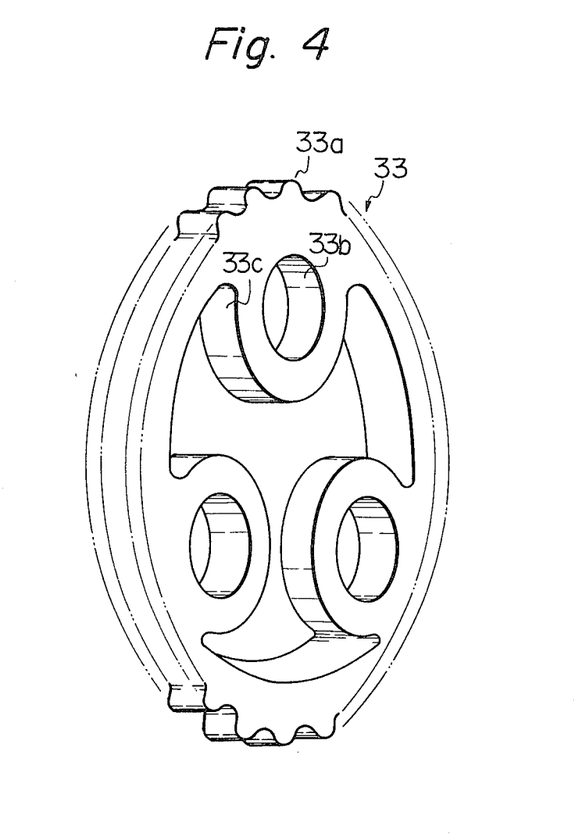
FIG. 4 is a perspective view of a pinion which is utilized in the first embodiment.

Referring to FIG. 4, the pinion 33 has outer gear teeth 33a, each of which has a profile which is identical to a curve having a constant distance from a pericycloid. The pinion 33 further has pin holes 33b which engage with the crank portions 31a or 31c (FIG. 1) of the crankpin 31 (FIG. 1) via the bearings 35 (FIG. 1). The pinion 33 has a star shape groove 33c which radially and equidistantly extends and which is slightly larger than the star shape portion 19 (FIG. 3) of the support block 13 (FIG. 3).

Again referring to FIG. 1, ball bearings 36a and 36b are inserted onto the outer surface of the disc portion 17 of the support block 13 and the outer surface of the end plate 25 of the support block 13 so that a hub 37 is rotatably supported by means of the bearings 36a and 36b. The hub 37 is utilized to drive the drive sprocket 7 of the crawler vehicle. The hub 37 has pins 39 having a small diameter and equidistantly securely attached to the inner side thereof, the number of the pins 39 being slightly more than that of the outer gear teeth 33a (FIGS. 2 and 4) formed at the periphery of the pinion 33, so that a pin gear is formed. instead of secure attachment of the pins 39, the pins may be rotatably mounted in recesses (not numbered) formed on the inner surface of the hub 37. In this case, it is preferable that the sides of the outer races of the bearings 36a and 36b (FIG. 1) be utilized to prevent the axial movement of the pins 39.

Figure 2:
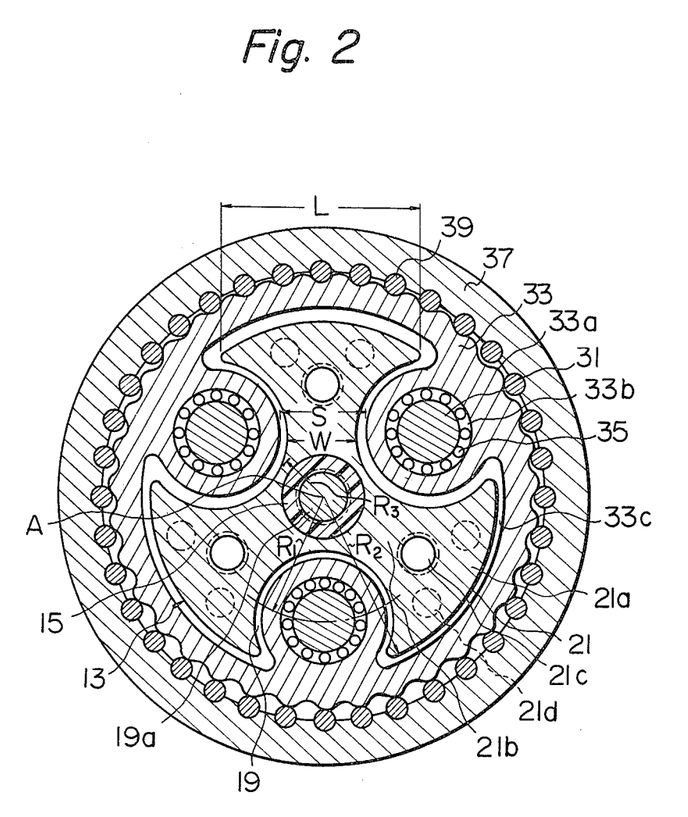
FIG. 2 is a cross sectional view taken along line II—II in FIG. 1, wherein a sprocket and bolts for fastening the same are removed therefrom in order to facilitate easy understanding.

It can be seen from FIG. 2 that the star shape groove 33c of the pinion 33 is loosely inserted onto the star shape portion 19 which is composed of the column portions 21 of the support block 13 (FIGS. 1 and 3). Accordingly, referred to FIG. 1, as the crankpins 31 rotate, the central axes of the crank portions 31a and 31c eccentrically revolve about the rotary axis $A_{CD}$ of the crankpins 31, and as illustrated in FIG. 2, the outer gear teeth 33a mesh with the pin gear formed on the hub 37. When the distance between the center A and the arranged position of the pin holes 33b (FIG. 4) of the pinion 33, i.e., the arranged position of the bearing inserting holes 17b (FIG. 3) of the support block 13 is denoted by a radius $R_1$ (FIG. 2), and the distance between the center A and the outermost portion of the column portion of the support block 13 is denoted by $R_2$ (FIG.2), it is preferable that the ratio $R_1$ to $R_2$, i.e., $R_1/R_2$, be selected in a range between 1/1.15 and 1/1.55. If the ratio is smaller than the preferred range, the durability of the radially extending base portion 21b of the column portion of the support block 13, against the radial stress created by the load from the outside and by the generation of the torque may not be high. On the contrary, if the ratio is larger than the preferred range, the thickness of the pinions 33 located between the periphery of the pinions 33 and the star shape groove 33c becomes too small to bear the stress exterted on the pinions 33, and as a result, the strength of the pinions 33 may be poor. When the diameter of the portion having the smallest diameter in the star shape portion 19 of the support block 13 (FIG. 2) is denoted by $R_3$, it is preferable that the ratio $R_1/R_3$ be selected in a range between 1/0.267 and 1/0.433. If the ratio is smaller than this range, the thickness of the base portion of the star shape portion 19 formed in the support block 13 is too small to effectively achieve a connection. On the other hand, if the ratio exceeds this range, the thickness of the portions around the pin holes 33b formed in the pinions 33 is too small to give sufficient strength to the pinions. When the circumference of the head portion 21a of the column portion 21 formed in the support block 13 is denoted by L, and the shortest distance between the walls of the adjacent pin holes is denoted by S, it is preferable that the ratio S/L be in a range between 1/0.75 and 1/1.30. If the ratio is less than this range, the length of the head portion 21a may be too short to withstand the stress created by the torsion load. On the contrary, if the ratio exceeds this range, the strength of the pinion may be inferior. This is because, although the pinion 33 should have through holes, the length of which corresponds to the length L of the head portions 21a of the support block 13, if the ratio exceeds the above-mentioned range, the length of the through holes extending in the circumferential direction in the pinions 33 is excessively long. When the minimum width of the base portions 21b is denoted by W, it it preferable that the ratio of the above-mentioned shortest distance S to the minimum width W, i.e., S/W, be selected in a range between 1/0.40 and 1/0.73. If the ratio is less than this range, the base portions 21b are too narrow to be durable against the radial load. On the other hand, if the ratio exceeds this range, the distances between the pin holes 33b and the star shape grooves 33c in the pinions 33 are too thin to withstand the external force. Please note that the portion with the minimum width W of the base portion 21b is generally located on or near a line connecting the centers of the bearing inserting holes 17b (FIG. 3) located at both sides of the base portion 21b.

It is preferable that, as illustrated in FIG. 2, the head portion 21a of the support block 13 have an arc, which is described about the center A of the support block 13, and the base portion 21b have arcs, which are described about the centers of the bearing inserting holes 17b, and the head portion 21a be combined with the base portion 21b in one body, because the head portion 21a extends circumferentially for a long distance and because the cross sectional area of the colum portion 21 can be at a maximum.

Figure 5:
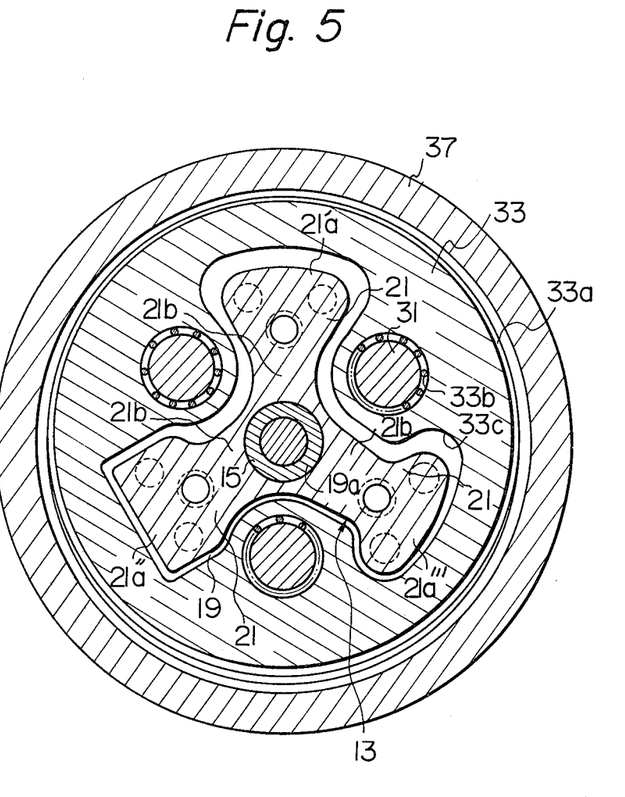
FIG. 5 is a cross sectional view, corresponding to FIG. 2, which illustrates second, third and fourth embodiments wherein there upper portions of the support block are modified.

In other embodiments which are illustrated in FIG. 5, the head portion of the column portion 21 in the support block 13 may be a triangular shape as denoted by reference numeral 21a', a rectangular shape as denoted by reference numeral 21a'', or an oval shape as denoted by reference numeral 21a'''. Please note that the column portion 21 has a T shape. In these cases, the star shape groove 33c formed in the pinion 33 has a shape corresponding to the star shape portion 19 formed by the column portion 21 in the support block 13, and it is preferable that the size of the parts be selected in the ranges explained hereinbefore.

Figure 6:
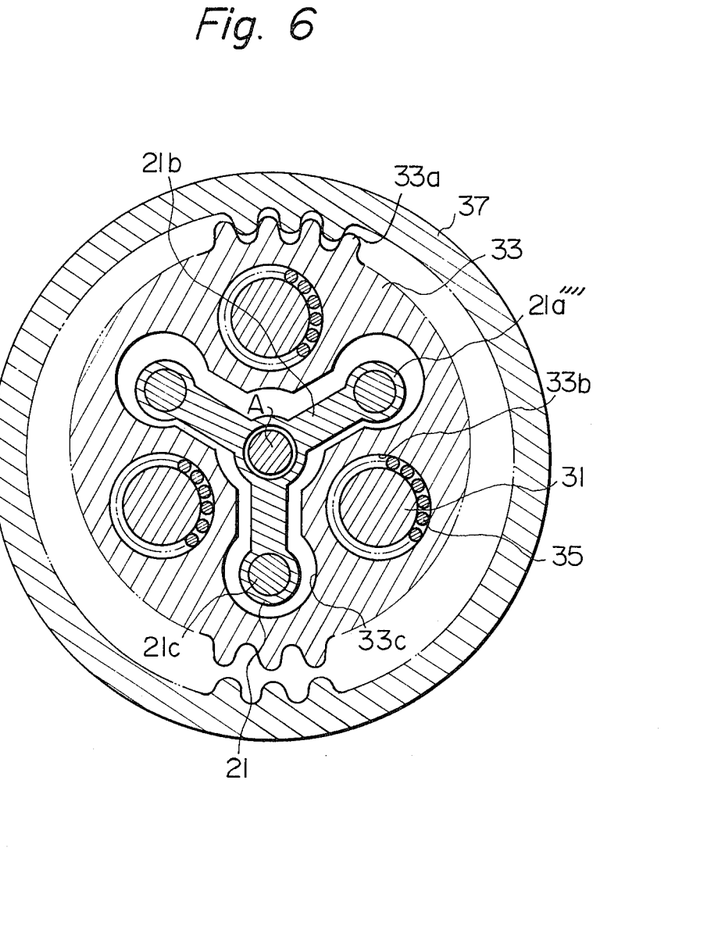
FIG. 6 is a cross sectional view of a fifth embodiment of the present invention.

In another embodiment of the present invention, the support block 13 is comprised of three column portions 21b radially extending from the central portion thereof and circular portions 21a'''' connected to the outermost portions of the column portions 21b. The remaining parts in FIG. 6 are similar to those illustrated in FIG. 2, except that involute teeth are formed on the inner surface of the hub 37, and accordingly, the like parts are denoted by the same reference numerals as in FIG. 2, and their further explanation is omitted here.

Referring again to FIG. 1, the right front end of the rotary input shaft 11 is splined and has a first outer gear 41 integrally secured thereto. Similarly, the right front ends of the crankpins 31 are splined and have second outer gears 43 which mesh with the first outer gear 41 and have more teeth than the first outer gear 41. A cover 47 is sealingly fastened to the hub 37 by means of bolts 45 so that the cover 47 is located outside the gears 41 and 43. In addition, an oil seal 49 is disposed outside the bearing 36a which rotatably supports the hub 37 so that leakage of lubricant from the speed change device 5 is prevented.

The rotation of the outer shaft of the hydraulic motor 3, i.e., the rotary input shaft 11 of the speed change device 5, is transmitted to the second outer gears 43 through the first outer gear 41 secured to the rotary input shaft 11 while the rotational speed is reduced in accordance with the ratio of the number of teeth between the second and first outer gears 43 and 41. As the second outer gears 43 are rotated, the crank portions 31a of the crankpins 31 which are rotatably supported in the support block 13 create a revolutional movement, and as a result of the revolutional movement, the pinions 33, the pin holes 33b of which engage with the crank portions 31a via bearings 35, are eccentrically revolved. With the eccentric revolutional movement of the pinions 33, the outer gear teeth 33a (FIG. 2) formed at the periphery of the pinions 33 engage with the pins 39 of the pin gear (not numbered) formed within the hub 37, and accordingly, the hub 37 is rotated at a reduced rotational speed. As a result, the driving system of the crawler vehicle is driven by means of the sproket 7 attached to the hub 37.

According to the first embodiment of the speed change device illustrated in FIGS. 1 through 4, this invention could generate ten times more torque than the conventional device described in the above-mentioned Japanese Patent Publication No. 25398/64 when the reduction ratio and the outer diameter of the devices are the same.

In the above-explained embodiments, the speed change devices having three crankpins have a star shaped support block composed of three column portions 21 and a pinion having a star shape groove 33c corresponding to the shape of the support block. The present invention is also applicable to a speed change device having more than or less than three crankpins. If there are more than three crankpins, it is possible to arrange the column portions at every two positions between the adjacent crankpins instead of arranging the column portions at every position between the adjacent crankpins.

In the above-explained embodiments, the support block 13 is also utilized as a casing of the hydraulic motor 3. However, the present invention is also applicable to a speed change device which is arranged separately from a motor. In this case, the support block 13 is naturally separated from the casing of the hydraulic motor 3. It is possible that, instead of the hydraulic motor being utilized in the above-mentioned embodiment, an electric motor or a pneumatic motor may be utilized.

Figure 7:
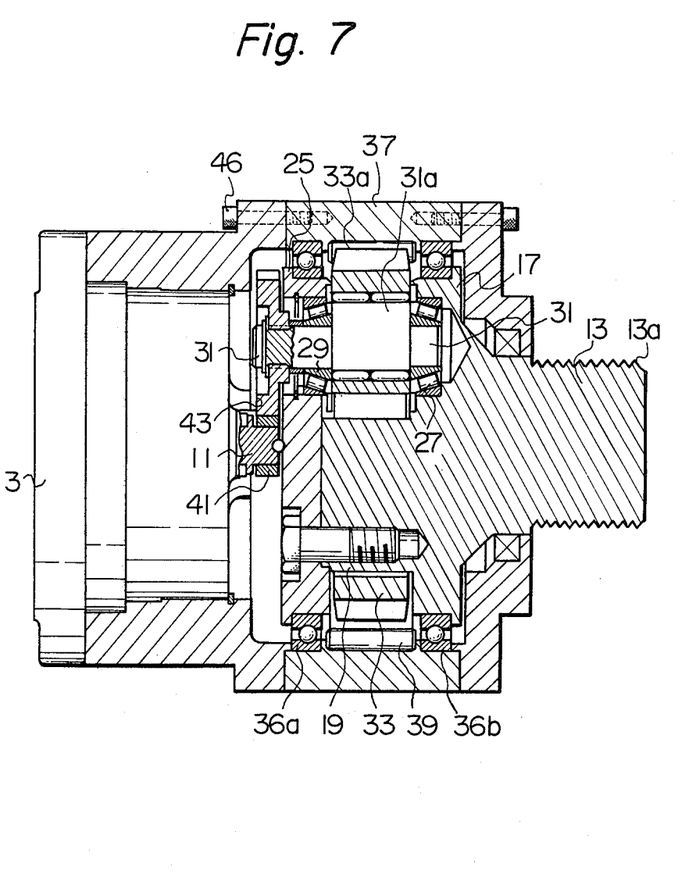
FIG. 7 is a cross sectional view of a sixth embodiment of the present invention.

In the above-explained embodiment, the output torque is taken up from the hub 37. However, it is possible that the hub 37 of the speed change device according to the present invention be made stationary and that the output be taken up from the support block which is coaxially disposed with the input shaft. An example is illustrated in FIG. 7, wherein the same parts as illustrated in the first embodiment in FIGS. 1 through 4 are denoted by the same reference numerals and their further detailed explanation is omitted here and only the points different from the first embodiment are explained hereinbelow.

The hub 37 is fixedly secured to the casing of the hydraulic motor 3 by means of bolts 46. Also, in this embodiment, the output shaft 11 of the hydraulic motor 3 serves as a rotary input shaft of the speed change device. The length of the input shaft 11 is made as short as possible so that the end surface of the shaft does not pass through the support block 13 and so that the first outer gear 41 faces the hydraulic motor 3. Similar to the first embodiment, the support block 13 is composed of a disc portion 17 and a star shape portion 19 which comprises three column portions connected to each other and an end plate 25. However, their arrangement is the opposite of that in the first embodiment. In other words, the end plate 25 faces the first outer gear 41. The crankpins 31 provided with the second outer gears 43 are supported in a beam manner by the bearings 27 and 29 mounted on the support block 13, and the shape of the column portions of the support block is the same as the shape in the first embodiment. The right end of the support block 13 projects and has a thread portion 13a to which a driving gear (not shown) for transmitting output may be threadedly secured. Bearings 36a and 36b are mounted between the outer perephery of the support block 13 and the inner surface of the hub 37 so that the support block 13 is rotatable with respect to the stationary hub 37. Thus, the rotary movement of the rotary input shaft 11 caused by the hydraulic motor 3 is transmitted to the second outer gears 43 through the first outer gear 41 while the speed is reduced so that the revolutional movement of the crank portions 31a of the crankpins 31 is created. As a result, the pinions 33 are eccentrically revolved, and the outer gear teeth 33a, which are formed in a shape having a constant distance from a pericycloid, mesh with a pin gear 39 formed inside the hub 37. Since the hub 37 is stationary, the support block is rotated at a reduced speed and the output torque is generated in the driving gear.

What we claim is:

1. A speed change device which comprises:
   a first outer gear secured to an input shaft;
   a plurality of second outer gears meshing with said first outer gear;
   a plurality of rotatably mounted crankpins which are connected to said second outer gears so that the rotary movement of said second outer gears is transmitted into a rotational movement of said crankpins;
   an eccentrically revolving pinion which has a plurality of pin holes formed therein, and which are circumferentially spaced from each other, and outer gear teeth formed on a periphery thereof;
   said crankpins being inserted into said pin holes so that the eccentric revolutional movement of said pinion is generated by means of said rotational movement of said crankpins; and
   a hub surrounding said outer gear teeth of said pinion and having inner gear teeth which mesh with said outer gear teeth, said speed change gear being characterized in that:

said pinion having a plurality of through holes, each through hole being formed in a space between adjacent pin holes thereof;

a support block arranged to permit a relative rotation to occur between said hub and said support block, having a plurality of column portions formed thereon and loosely inserted into said through holes of said pinion, and wherein the opposite ends of said block rotatably support said crakpins;

said through holes in said pinion and said column portion of the said support block including a first portion extending circumferentially and a second portion extending radially and inwardly from said first portion; and at least one bearing which is mounted between said support block and said hub so that the relative rotational movement of said support block and said hub is permitted.

2. A speed change device which comprises a first outer gear secured to an input shaft; a plurality of second outer gears meshing with said first outer gear; a plurality of rotatably mounted crankpins which are connected to said second outer gears so that the rotary movement of said second outer gears is transmitted into a rotational movement of said crankpins; an eccentrically revolving pinion which has a plurality of pin holes formed therein, and which are circumferentially spaced from each other, having outer gear teeth formed at the periphery thereof; said crankpins being inserted into said pin holes so that the eccentric revolutional movement of said pinion is generated by means of said rotational movement of said crak pins; and a hub surrounding said outer gear teeth of said pinion and having inner gear teeth which mesh with said outer gear teeth, said speed change gear being characterized in that:

said pinion having a plurality of through holes formed therein, the ends of which are connected to each other at the central portion of said pinion; a support block having a plurality of column portions formed thereon and loosely inserted into said through holes of said pinion, said column portions having inner ends which are connected to each other and the opposite ends of which block rotatably support said crankpins; and at least one bearing which is mounted between said support block and said hub so that a relative rotational movement of said support block and said hub is permitted.

3. A speed change gear according to claim 2 wherein each of said column portions includes a first portion extending circumferentially and a second portion extending radially between said connected inner ends and said first portion.

4. A speed change device according to claim 1, 2 or 3 wherein said support block comprises:

a body portion of said support block which has said column portions formed thereon; and an end plate fixedly secured to said column portions.

5. A speed change device according to claim 1, 2 or 3 wherein said inner gear teeth formed on the inner surface of said hub are composed of pins having a small diameter.

6. A speed change device according to claim 1, 2 or 3 wherein a plurality of said pinions are disposed parallel to each other within said hub so that they mesh with said inner gear teeth of said hub.

7. A speed change device according to claim 4 wherein said at least one bearing which is mounted between said support block and said hub comprises two bearings wherein one of said bearings is mounted between the outer surface of said body portion of said support block and the inner surface of said hub and the second bearing is mounted between the outer surface of said end plate and the inner surface of said hub.

8. A speed change device which comprises:

a first outer gear secured to an input shaft;

a plurality of rotatingly mounted second outer gears meshing with said first outer gear;

a plurality of crankpins which are connected to said second outer gears so that the rotary movement of said second outer gears is transmitted into a rotational movement of said crankpins;

a pinion which has a plurality of pin holes formed therein, and which are circumferentially spaced from each other, and outer gear teeth formed at the periphery thereof;

said crankpins being inserted into said pin holes so that an eccentric revolutional movement of said pinion is generated by means of said rotational movement of said crankpins; and a hub surrounding said outer gear teeth of said pinion and having inner gear teeth which mesh with said outer gear teeth, said speed change gear being characterized in that:

said pinion has at least one through hole formed at a space between adjacent pin holes thereof;

a support block which has at least one column portion formed thereon and loosely inserted into said through holes of said pinion, and the opposite ends of which block rotatably support said crankpins;

said column portion has a circumferential width and a radial thickness, said circumferential width being different from said radial thickness; and at least one bearing which is mounted between said support block and said hub so that a relative rotational movement of said support block and said hub is permitted.

9. A speed change device according to claim 8, wherein said circumferential width of said column portion is larger than said radial thickness.

* * * * *